(12) United States Patent
Gatherer

(10) Patent No.: US 6,765,956 B1
(45) Date of Patent: Jul. 20, 2004

(54) MULTIPLE SAMPLING FRAME SYNCHRONIZATION IN A WIRELINE MODEM

(75) Inventor: Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/531,246

(22) Filed: Mar. 21, 2000

Related U.S. Application Data

(60) Provisional application No. 60/131,636, filed on Apr. 28, 1999.

(51) Int. Cl.[7] .................................................. H04L 5/16
(52) U.S. Cl. ....................................................... 375/222
(58) Field of Search ................................ 375/223, 343, 375/354, 364–66; 370/207

(56) References Cited

U.S. PATENT DOCUMENTS

| | | | | |
|---|---|---|---|---|
| 5,428,647 A | * | 6/1995 | Rasky et al. ................ 375/366 |
| 5,444,697 A | * | 8/1995 | Leung et al. ................ 370/207 |
| 5,703,913 A | * | 12/1997 | Yamamoto et al. ......... 375/354 |
| 5,841,481 A | * | 11/1998 | Yoshikawa .................. 348/500 |
| 6,002,729 A | * | 12/1999 | Schmidt ...................... 375/364 |
| 6,038,270 A | * | 3/2000 | Watanabe et al. ........... 375/343 |
| 2002/0009166 A1 | * | 1/2002 | Steffens et al. ............. 375/343 |

* cited by examiner

*Primary Examiner*—Stephen Chin
*Assistant Examiner*—Lawrence Williams
(74) *Attorney, Agent, or Firm*—Abdul Zindani; W. James Brady, III; Frederick J. Telecky, Jr.

(57) ABSTRACT

A modem comprises circuitry for receiving an analog signal from a line and circuitry for converting the analog signal to a digital signal. The digital signal comprises a plurality of ideal sample points (P0–P3), each separated in time by a period T, and the plurality of ideal sample points comprises a sync sequence (14). The modem further comprises circuitry (34) for detecting the sequence comprising an integer number S of sampling circuits (38, 40), wherein S is two or greater. Each of the sampling circuits comprises circuitry for taking a sample corresponding to each of the plurality of ideal sample points at least once per the period T. Each of the sampling circuits also comprises circuitry for comparing a plurality of taken samples to a correlation sequence. Finally, each of the sampling circuits comprises circuitry for outputting a sync detected signal ($SYNC_0$, $SYNC_1$) in response to a sufficient match between the plurality of taken samples and the correlation sequence.

28 Claims, 5 Drawing Sheets

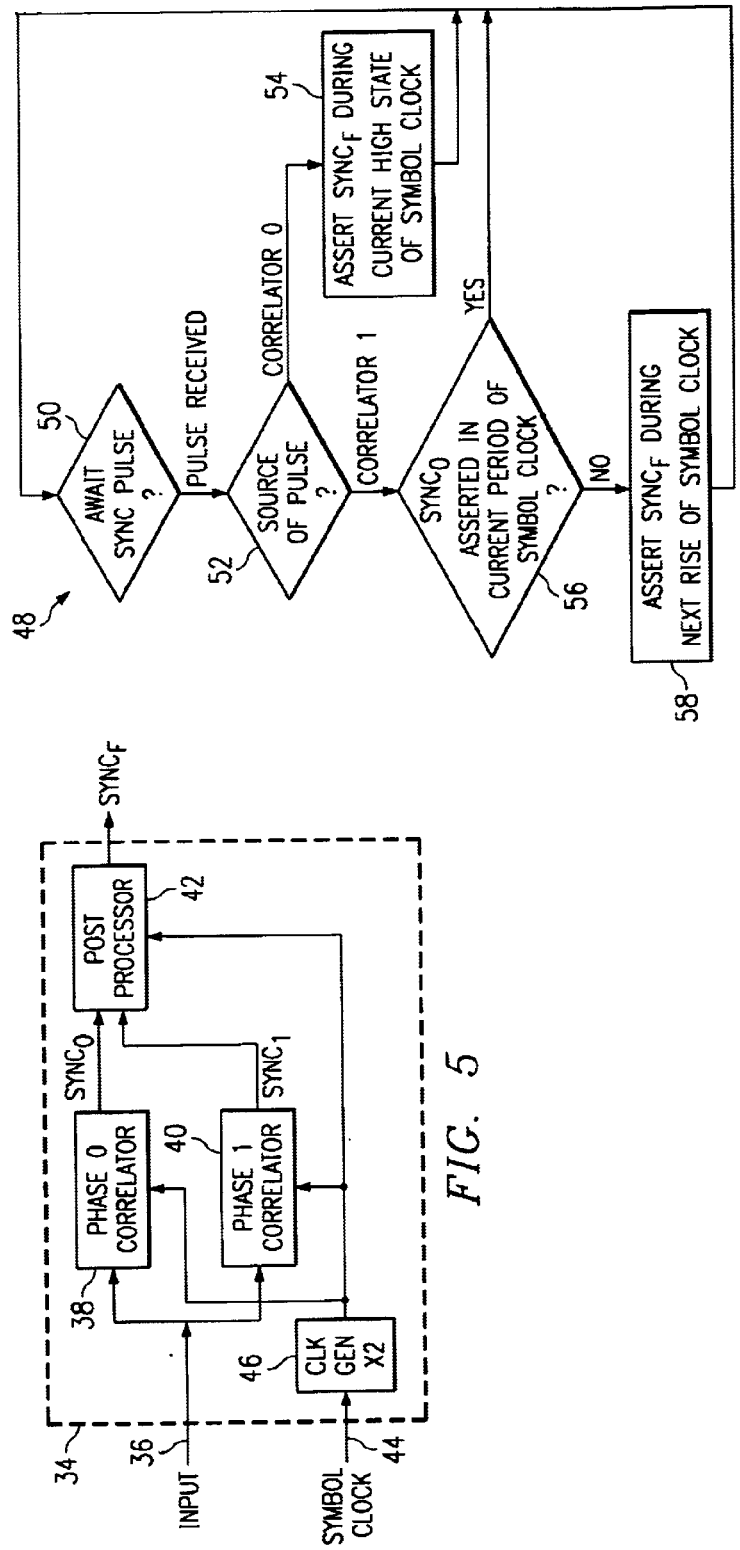
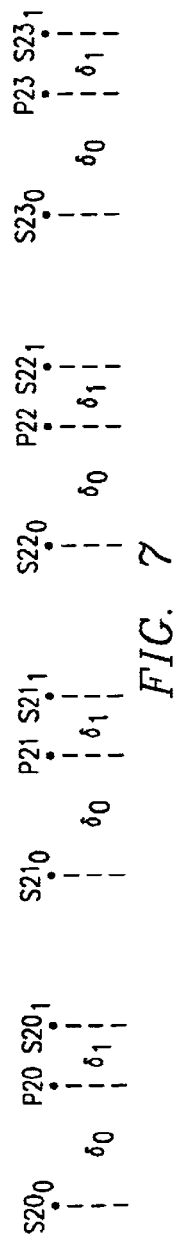
FIG. 8
FIG. 5
FIG. 7

MULTIPLE SAMPLING FRAME SYNCHRONIZATION IN A WIRELINE MODEM

This application claims priority under 35 USC 119(e) (1) of provisional application number 60/131,636 filed Apr. 28, 1999.

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to modems, and are more particularly directed to frame synchronization in wireline modems.

The high-speed exchange of digital information between remotely located computers is now a pervasive part of modem computing in many contexts, including business, educational, and personal computer uses. It is contemplated that current and future applications of high speed data communications will continue the demand for systems and services in this field. For example, video on demand ("VOD") is one area which has for some time driven the advancement of technology in the area of digital information exchanges. More recently, the rapid increase in use and popularity of the Global Internet has further motivated research and preliminary development of systems directed to advanced communication of information between remotely located computers, particularly in accomplishing higher bit rates using existing infrastructure.

Various types of modems have been and continue to be developed to achieve the high speed data communication arising from matters such as those described above. For example, ISDN modems typically transmit and receive data at speeds of 64 Kbps and 128 Kbps. As another example, cable modems are currently under development with the promise of data connections of much higher speeds than ISDN. More particularly, cable modems are anticipated to receive data at up to 10 Mbps and send data at speeds up from 2 to 10 Mbps. Still other modems are also known in the art.

Given the proliferation of wireline modems, many such modems use frame structures to communicate information. By way of example, therefore, FIG. 1 illustrates such a frame designated generally at 10. By way of example, frame 10 is a quadrature amplitude modulation ("QAM") frame, where it is known in the art that QAM frames encode data in an analog signal which includes one of a different available combination of phases and amplitudes to represent different bit patterns. Within frame 10 is provided training data 12 to tune an equalizer in the receiving modem. In order to locate training data 12, frame 10 also includes a synchronization or "sync" sequence 14 placed at the start of frame 10. As a result, a receiving modem must recognize sync sequence 14 at some point during the receipt of frame 10. Once this recognition occurs, it may be determined where the beginning of the frame is located, and it thus will be known where the end of sync sequence 14 occurs. Knowing the location of the end of sync sequence 14 thereby identifies the location of the beginning of training data 12. Additionally, frame 10 includes user data 16 located after training data 12 and, thus, by locating the position of training data 12, the location of user data 16 also may be determined.

By way of further background, FIG. 2 illustrates a block diagram of a receiver path in a modem 18. The block diagram of modem 18 is a general representation and, thus, applies in general to the prior art but also may be modified as described later to form an inventive embodiment. Modem 18 receives frame data as an analog signal from a wireline (e.g., a telephone line or a cable, such as a coax cable), and that data is input to an analog-to digital converter ("ADC") 20 where it is converted to a digital form. The digitally converted signal then passes to a timing recovery block 22 that re-times the sampling of the input waveform so that the receive sampling frequency tracks that of the transmitter in frequency. Next, the signal passes to a demodulator 24 that removes the data from its modulated form, thereby producing the baseband values of the data. Note that the frequency of the baseband value signal output from demodulator 24 is typically at some integer multiple (or other fraction greater than one) of the symbol rate; commonly, therefore, the output of demodulator 24 is at two times the symbol rate. From the output of demodulator 24, the demodulated data passes to both a sync block 26 as well as an equalizer and carrier recovery block 28. Sync block 26 locates sync sequence 14 in each frame as detailed below, and when this location occurs sync block 26 asserts a SYNC signal to equalizer and carrier recovery block 28 so that it may synchronize itself to the incoming signal and perform training. Equalizer and carrier recovery block 28 outputs the equalized signal to a symbol decision block 30. Symbol decision block 30 performs the function of estimating the transmitted data from the output of equalizer and carrier recovery block 28. This is usually performed by finding the nearest point in the signal constellation to each received sample. This result is output to a deframer 32. In addition, symbol decision block 30 feeds back a signal to equalizer and carrier recover block 28 in order to provide decision-directed tracking of changes in the channel during the data portion of the frame. Lastly, note that, the SYNC signal from sync block 26 is also connected to deframer 32 so that it too may synchronize itself to the incoming signal. Further, deframer 32 performs the function of removing training data 12 and sync sequence 14 from frame 10, thereby leaving only user data 16.

Looking now to sync block 26 in greater detail, it locates sync sequence 14 in each frame 10 by taking periodic samples, where this approach is now described with the benefit of a general timing illustration in FIGS. 3a and 3b. Specifically, in FIG. 3a, let the points P0 through P3 represent successive ideal sample locations in sync sequence 14, with a common time period T between each location. In other words, in an ideal situation, sync block 26 would sample the incoming signal at the exact point in time corresponding to point P0; in the art, this point is sometimes referred to as the center of a so-called eye diagram, with it understood that an actual sample taken at this ideal point is most likely to result in proper synchronization, and any increase in time between this ideal point and the actual sample point correspondingly decreases the synchronization performance (i.e., decreases the chance of successful synchronization). Additionally, given the sampling period T, sync block 26 then also ideally samples at each interval of T thereafter, thereby sampling exactly at the points P1, P2, and P3 illustrated in FIG. 3a. However, various factors cause sync block 26 to take actual samples at a phase shifted point in time which is away from that of each point in FIG. 3a.

Such factors include the fact that there is no common clock or timing signal for synchronization between the transmitter and the receiver, and also may include other factors such as channel distortion and carrier errors. By way of example, therefore, FIG. 3b again illustrates points P0 through P3, and further illustrates a first scenario where a first actual sample S0 is taken, followed thereafter by additional samples at each period of T thereafter. Thus, samples are taken at times represented as S0, S1, S2, and S3. As the samples are taken, a technique is used whereby the samples are convolved with a filter correlation sequence that represents a time reversed, complex conjugate of sync sequence 14. As a result, the convolution determination will peak when sync sequence 14 is aligned with the filter correlation sequence. Also in this regard, in an effort to produce the greatest possible peak, note that sync sequence 14 is typically formed by selecting from the four highest energy points of the symbol constellation and, indeed, using only the two of those four points that have the greatest spectral distance between them (i.e., $-15-j_{max}+15+j_{max}$ for QAM). Given these considerations, the convolution peak may be detected by comparing the convolution result against a threshold, where the threshold is set to a level just below the anticipated maximum peak. Accordingly, when the threshold is exceeded, sync block 26 asserts its SYNC output, thereby informing other blocks in FIG. 2 that synchronization has occurred.

While the preceding approach may prove acceptable in some contexts, note further in FIG. 3b that a length of time (or phase shift), indicated in FIG. 3b as δ, occurs between each ideal sampling point and a corresponding actual sample. In other words, in FIG. 3b δ is a length representing a distance between the ideal sampling time and the actual sampling time. Moreover, because of this time separation, note that the peak of the convolution may be less than the anticipated peak. As a result, under the prior art approach it may be required that the threshold used for comparison is lowered to accommodate the lower corresponding peak. However, if the threshold is set too low, then it may be exceeded in some instances when an actual sync sequence has not been detected, which in turn could cause errant assertions of the SYNC output of sync block 26. Quite clearly, these errant assertions of the SYNC output may cause wrongful interpretation of incoming data.

Given the preceding, it has been recognized by the present inventor that the length of δ directly affects the likelihood that the prior art system will properly detect sync sequence 14 in an incoming frame. Additionally, for systems of the type shown in FIG. 2, a maximum value of δ, designated from this point forward as $δ_{max}$, may be determined empirically under which proper synchronization detection is ensured (or at least expected to meet an accepted confidence level). To further illustrate this point, assume by way of example that $δ_{max}$ is determined empirically to equal T/4. This example is further illustrated in FIG. 4. More particularly, FIG. 4 once more illustrates points P0 through P3. Additionally, because $δ_{max}$ equals T/4, then proper operation should occur so long as the sample for each point occurs within a time period no greater than T/4 before or after each such point. To further illustrate these periods of anticipated proper operation, a sampling window of time having a period from T/4 before the point to T/4 after the point is shown with respect to each of points P0 through P3, labeled for reference as SW0 through SW3, respectively. Having defined sampling windows SW0 through SW3, there also are periods of time that do not fall within these sampling widows. Given the preceding definitions, therefore, these periods of time represent instances where, if sampling occurs, proper sync detection may not occur. These periods are shown as error windows EW0 through EW3 in FIG. 4. Note that each error window occurs beyond both edges of the sample window, that is, because the sample window is by definition centered about the point, then each point will have two corresponding error windows, one before and one after the sample window. Thus, in FIG. 4, it is noted that the second instance of error window EW0 following point P0 coincides with a first instance of error window EW1 preceding point P1. A similar observation may be made regarding the remaining sample and error windows.

From the above, the present inventor notes that the prior art may provide various drawbacks. For example, for a given system, if $δ_{max}$ is relatively short, then the error windows EW0 through EW3 are relatively large. Accordingly, the chance of the periodic samples falling within error windows EW0 through EW3 are likewise increased, thereby increasing the likelihood of faulty sync detection, where faults may include both errant indication of synchronization or a total failure to achieve synchronization. Certain attempts may be made to reduce the chances of error by increasing the length of $δ_{max}$, such as by increasing the number of symbols in sync sequence 14. However, such an approach thereby reduces the bandwidth available for user data and, thus, may be undesirable. Consequently, this as well as other efforts may require greater resources (and cost), or simply may not be acceptable or feasible in various contexts. As a result, there arises a need to address the drawbacks of the prior art, as is achieved by the embodiments described below.

BRIEF SUMMARY OF THE INVENTION

In the preferred embodiment, there is a modem. The modem comprises circuitry for receiving an analog signal from a line and circuitry for converting the analog signal to a digital signal. The digital signal comprises a plurality of ideal sample points, each separated in time by a period T, and the plurality of ideal sample points comprises a sync sequence. The modem further comprises circuitry for detecting the sync sequence, comprising an integer number S of sampling circuits, where S is two or greater. Each of the sampling circuits comprises circuitry for taking a sample corresponding to each of the plurality of ideal sample points at least once per the period T. Each of the sampling circuits also comprises circuitry for comparing a plurality of taken samples to a correlation sequence. Finally, each of the sampling circuits comprises circuitry for outputting a sync detected signal in response to a sufficient match between the plurality of taken samples and the correlation sequence. Other circuits, systems, and methods are also disclosed and claimed.

BRIEF DESCRIPTION OF THE SEVERAL VIEWS OF THE DRAWING

FIG. 5: illustrates a block diagram of a first embodiment of an improved synchronization block for use in a modem such as that shown in FIG. 2 or in other wireline modems;

FIG. 6b illustrates the points of FIG. 6a given an example of a first system value $\delta_{max}$ defining sample windows and error windows arising from a first instance of relative timing between the ideal sample points and the actual sample points of FIG. 6a;

FIG. 6c illustrates the points of FIG. 6a given an example of a second system value $\delta_{max}$ defining sample windows and error windows arising from the first instance of relative timing between the ideal sample points and the actual sample points of FIG. 6a;

FIG. 7 illustrates a series of ideal sample points occurring in time, where the two sets of actual sample points taken with respect to each ideal-sample point occur such that a first actual sample point is taken before a corresponding ideal sample point and a second actual sample point is taken after the corresponding ideal sample point;

FIG. 8 illustrates a flow chart of the preferred method of operation of the sync block of FIG. 5;

DETAILED DESCRIPTION OF THE INVENTION

Figure 1:
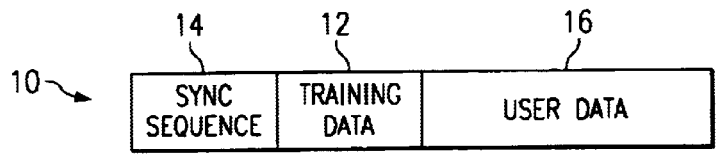
FIG. 1 illustrates a frame of information communicated by a wireline modem.
Figure 2:
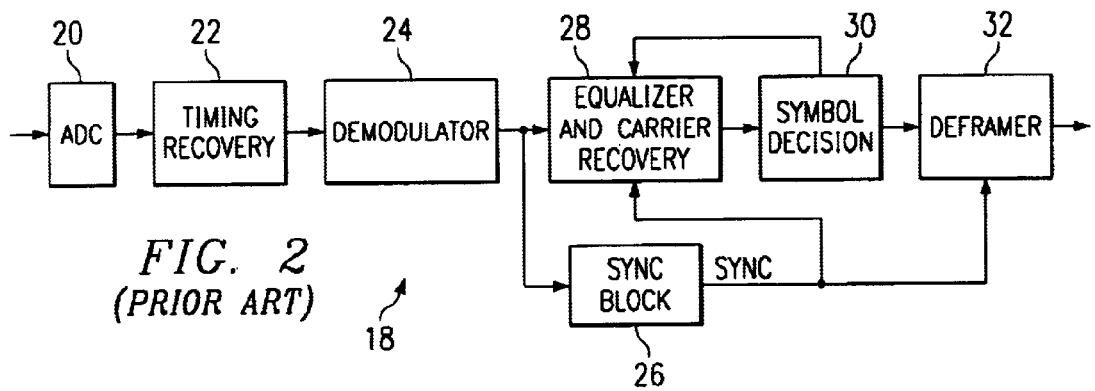
FIG. 2 illustrates a block diagram of a receiving path in a wireline modem.
Figure 3A:
FIG. 3a illustrates a series of ideal sample points occurring in time, each separated by a same period T.
Figure 3B:
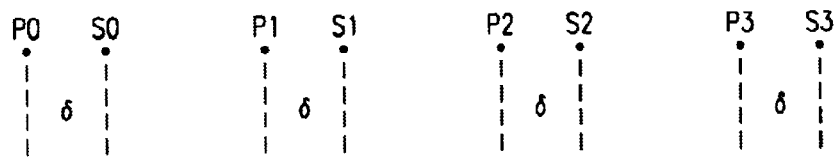
FIG. 3b illustrates the ideal sample points of FIG. 3a with the addition of actual sample points taken relative to each of the ideal sample points.
Figure 4:
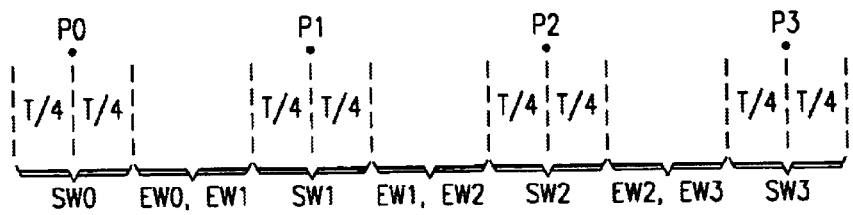
FIG. 4 illustrates the ideal sample points of FIG. 3a with the addition of sample windows and error windows defined relative thereto.

FIGS. 1 through 4 were discussed above by way of introduction and in some respects as relating to the prior art.

FIG. 5 illustrates a block diagram of an inventive sync block 34. Before looking to the details of sync block 34, first recall that it was earlier stated in connection with modem 18 of FIG. 2 that the block diagram therein may be modified to present an inventive embodiment. In this regard, the following provides a detailed discussion of sync block 34, where sync block 34 may be used in lieu of sync block 26 in FIG. 2 to thereby form an inventive embodiment. Alternatively, sync block 34 of FIG. 5 may be implemented in other wireline modems as well. In any event, any of the improved modems should provide more efficient frame synchronization functionality.

Turning to the details of sync block 34, it includes a data input 36 for receiving the demodulated incoming data frames, where those frames are coupled to the input of two different correlators. More particularly, each incoming frame is coupled to a phase 0 correlator 38 and a phase 1 correlator 40. Each phase correlator samples the incoming frame and provides a synchronization ("sync") detected signal to a corresponding input of a post processor 42; for purposes of reference, the sync detected signal provided by phase 0 correlator 38 is identified as $SYNC_0$ and the sync detected signal provided by phase 1 correlator 40 is identified as $SYNC_1$. Post processor 42 outputs a final sync detected signal, $SYNC_F$, which is usable by various other devices within the modem implementing sync block 34 for purposes of synchronization. For example, when sync block 34 is implemented in a modem such as modem 18 of FIG. 2, $SYNC_F$ may be used to synchronize sequence and compare circuit 28 and deframer 32 so that they may perform the functions described earlier.

Sync block 34 also includes a second input 44 for receiving the symbol rate clock, where that rate corresponds to the period T described earlier in connection with FIG. 3a. Input 44 couples the symbol rate clock to the input of a clock generator 46. Clock generator 46 doubles the symbol rate clock, that is, it provides an output clock signal that has a frequency equal to 2/T. This output clock signal is used to clock each of the other illustrated blocks in sync block 34, thereby facilitating a dual sample operation as further detailed in the remaining discussion.

The operation of sync block 34 is now explored. In general, phase 0 correlator 38 and phase 1 correlator 40 each periodically sample the information from input 36, and each compares the sample against a reference pattern to locate an incoming sync sequence. This comparison may be achieved using convolution to compare the samples against a correlation sequence as described earlier with respect to the prior art, or through other methods ascertainable by one skilled in the art. Accordingly, one skilled in the art may develop various different circuit and related architectures for achieving this functionality given the art. In any event, when a sufficient match occurs between the sample and the corresponding sequence, such as may be determined by comparison against a threshold value or some other technique, the corresponding correlator asserts its output sync detected signal. Importantly for purposes of the present inventive embodiment, however, is the timing of the samples taken by phase 0 correlator 38 and phase 1 correlator 40. This timing is explored below in connection with FIG. 6a.

Figure 6A:
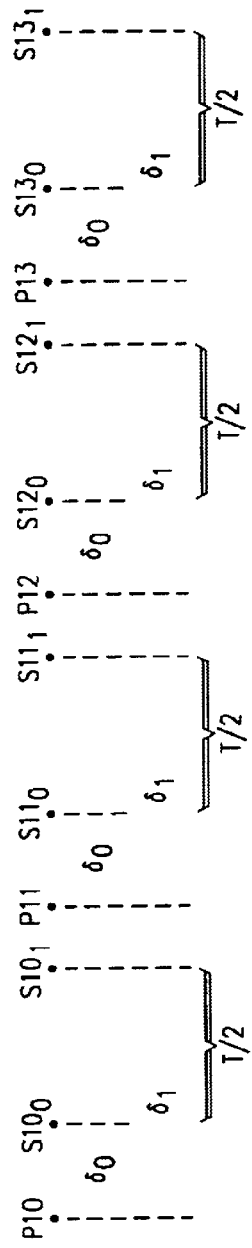
FIG. 6a illustrates a series of ideal sample points occurring in time, each separated by a same period T, and further illustrates two sets of actual sample points taken with respect to each of the ideal sample points.

FIG. 6a illustrates ideal sample points P10 through P13 representing successive ideal samples in a sync sequence, again with a symbol period T between each bit. FIG. 6a also illustrates actual samples $S10_0$, $S11_0$, $S12_0$, and $S13_0$ taken by phase 0 correlator 38 in relation to ideal sample points P10 through P13, respectively. With respect to these actual samples, note that the "0" designation from phase 0 correlator 38 is used as subscript with these samples to illustrate that the samples correspond to phase 0 correlator 38. In a similar manner, FIG. 6a illustrates actual samples $S10_1$, $S11_1$, $S12_1$, and S13 taken by phase 1 correlator 40 in relation to ideal sample points P10 through P13, respectively; here, the "1" designation from phase 1 correlator 40 is used as subscript with these actual samples. In general, therefore, and as explored below, FIG. 6a demonstrates that for each ideal sample point both correlators 38 and 40 take an actual sample corresponding thereto.

Attention is now turned to the timing of the samples taken by phase 0 correlator 38 and phase 1 correlator 40. In this regard, recall that clock generator 46 outputs a clock signal having a frequency of 2/T. In response to this and as illustrated in FIG. 6a, the samples taken by phase 0 correlator 38 and phase 1 correlator 40 alternate in sample operation so that for a given ideal sample point phase 0 correlator 38 first takes a sample and at a period, preferably of T/2, thereafter phase 1 correlator 40 takes a sample. Looking to ideal sample point P10 by way of example, phase 0 correlator 38 takes a sample $S10_0$ at some arbitrary time, and at a time T/2 thereafter phase 1 correlator 10 takes a sample $S10_1$. Similar timing observations should thus be apparent for the remaining samples taken and illustrated in FIG. 6a. Lastly in this regard, recall that the output of demodulator 24 is commonly at two times the symbol rate and, thus, there is no need to further adjust this signal in order to achieve the T/2 samples by correlators 38 and 40.

FIG. 6a also introduces an important aspect of the distance between alternating samples of correlators 38 and 40 with respect to the ideal sample points P10 through P13. More particularly, in FIG. 6a note that the first sample $S10_0$ by phase 0 correlator 38 occurs at some arbitrary time with respect to ideal sample point P10, and a distance of $\delta_0$ therefore exists between the sample and the corresponding ideal sample point. Because the other samples by phase 0 correlator 38 are later taken at a frequency of 1/T, then in general for subsequent samples they too will be separated by a distance of $\delta_0$ from the corresponding ideal sample point. Once the arbitrary-timed first actual sample $S10_0$ by phase 0 correlator 38 is taken, and because phase 1 correlator 40 then samples at a period T/2 thereafter, then a fixed distance relationship is also established between each sample of phase 1 correlator 40 and a corresponding ideal sample point. This fixed distance is shown in FIG. 6a as $\delta_1$.

Having established the sample distances of $\delta_0$ and $\delta_1$, their benefit is now appreciated by recalling the concept of $\delta_{max}$ and comparing it to the sample distances. Specifically, recall that $\delta_{max}$ may be empirically determined for a system and represents the greatest distance in time which may exist between an ideal sample point and an actual sample point while still permitting acceptable identification of the sync sequence. Against this background, below are explored several examples to illustrate the potential relationship of $\delta_{max}$ to $\delta_0$ and $\delta_1$, and to thereby demonstrate a benefit of the preferred embodiment.

Figure 6B:
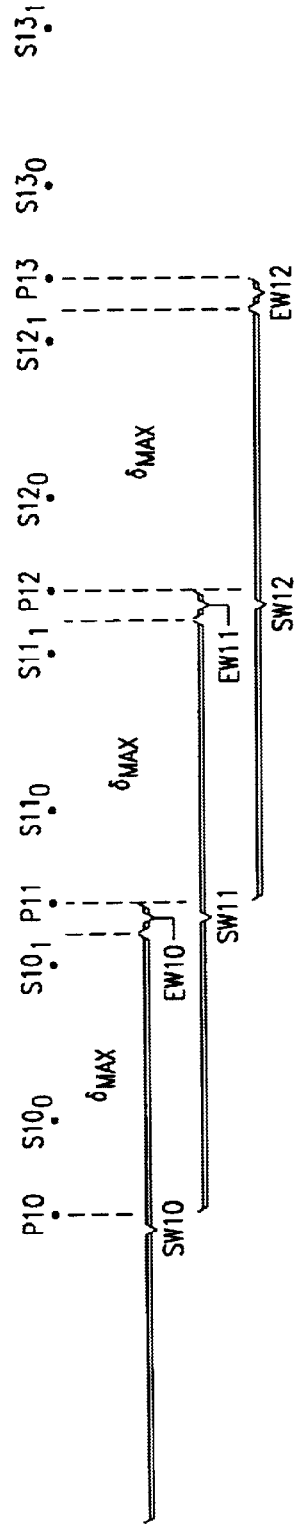

As a first example of the operation of sync block 34, suppose that $\delta_{max}$ for the system achieving the samples in FIG. 6a is determined to be greater than $\delta_{max}$. To further illustrate this example, FIG. 6b illustrates the ideal sample points and actual samples of FIG. 6a and further illustrates sampling windows SW10 through SW12 of length $2*\delta_{max}$ centered about each respective ideal sample point (SW 13 is not shown for simplicity sake). Further, since both $\delta_0$ and $\delta_1$ are less than $\delta_{max}$ then either the sample by phase 0 correlator 38 or the sample by phase 1 correlator 40 fall within the sampling windows and, hence, should produce an acceptable identification of the sync sequence.

Figure 6C:
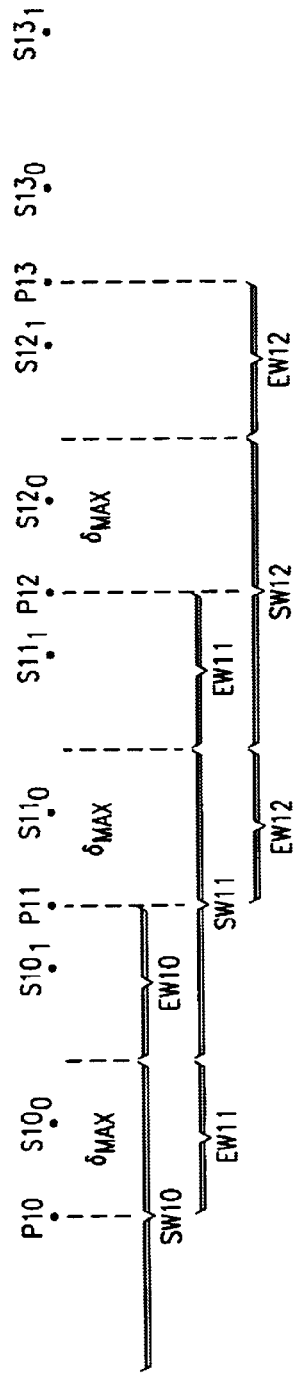

As a second example of the operation of sync block 34, suppose that $\delta_{max}$ for the system achieving the samples in FIG. 6a is determined to be greater than $\delta_0$, but less than $\delta_1$. To further illustrate this example, FIG. 6c illustrates the ideal sample points and actual sample points of FIG. 6a and further illustrates sampling windows SW10 through SW12 of length $2*\delta_{max}$ centered about each respective ideal sample point (again, SW13 is not shown for simplicity sake). In the present example, since $\delta_0$ is less than $\delta_{max}$ then samples $S10_0$ through $S13_0$ in FIG. 6c fall inside the sample windows and, hence, the samples taken by phase 0 correlator 38 may be used for proper sync sequence detection. In contrast, however, FIG. 6c also illustrates error windows EW10 through EW12. These error windows represent the same notion introduced in FIG. 4 earlier, that is, if a sample is taken during an error window, it does not provide satisfactory information for detection of the sync sequence. Indeed, in the present example, since $\delta_1$ is greater than $\delta_{max}$, note that the samples $S10_1$ through $S13_1$ in FIG. 6c fall inside of the error windows. As a result, for the current example the samples taken by phase 1 correlator 40 are not reliable for proper sync sequence detection. However, recall that the samples taken by phase 0 correlator 38 are acceptable for such detection. Accordingly, from the example of FIG. 6c it now should be appreciated that the method of taking dual samples per ideal sample point, as is achieved by sync block 34, significantly increases the possibility that at least one of the two correlators will obtain a set of satisfactory samples for proper sync sequence detection. This result is further illustrated below.

While the preceding example illustrates an instance where phase 0 correlator 38 produces acceptable samples while phase 1 correlator 40 does not, note that such a result arises due to the arbitrary location of the first sample $S10_0$ relative to the location in time of ideal sample point P10. To further illustrate this aspect, FIG. 7 illustrates a different set of ideal sample points P20 through P23 in a sync sequence, along with samples $S20_0$, $S21_1$, $S22_0$, and $S23_0$ taken by phase 0 correlator 38 and samples $S20_1$, $S21_1$, $S22_1$, and $S23_1$ taken by phase 1 correlator 40. In this example, the arbitrary timing of taking the first sample $S20_0$ causes it to be at a distance $\delta_0$ from P20, where that distance is greater than the distance $\delta_1$ between sample $S20_1$ and P20. In this example, therefore, if $\delta_{max}$ is determined to be greater than $\delta_1$, but less than $\delta_0$, then the samples taken by phase 1 correlator 40 provide proper sync sequence detection while the samples taken by phase 0 correlator 38 do not. In other words, the arbitrary timing of the FIG. 7 example demonstrates an instance where the limitation provided by $\delta_{max}$ is more likely to exclude the usefulness of the samples taken by phase 0 correlator 38 rather than those taken by phase 1 correlator 40.

Having demonstrated the general operation of correlators 38 and 40, one skilled in the art should now appreciate that either one or both correlators may provide samples sufficient to detect a sync sequence. Indeed, given the operation as discussed thus far, if $\delta_{max}$ is equal to or greater than T/2, then in each instance at least one of the two correlators should take a sample within an acceptable sample window. This may be contrasted with the prior art, where only a value of $\delta_{max}$ equal to T would ensure a comparable result. Accordingly, given that $\delta_{max}$ may be much smaller than in the prior art while still providing sufficient results, note therefore that such a value of $\delta_{max}$ may be achieved with a much shorter sync sequence. This in turn reduces the complexity of each correlator and there is less bandwidth required for overhead, thereby leaving more bandwidth for other data (e.g., user data).

Having described a preferred embodiment of sync block 34 including two correlators, an alternative embodiment may be created with an integer S number of correlators where S exceeds two, and where each corresponding correlator takes its sample at a period of T/S apart from any other correlator. Under this approach, at least one of the S correlators should provide satisfactory samples so long as the value of $\delta_{max}$ is equal to or greater than T/S. Alternatively, the two correlators already described may be connected as previously illustrated, but clocked or operated such that each takes more than one sample per period T, thereby providing a total of at least four samples per period T. In any event, therefore, even for systems with relatively low values of $\delta_{max}$ they may be made to provide satisfactory results by providing a sufficient number of correlators or correlator samples according to the principles discussed above. Still further, as N continues to increase, the necessary value of $\delta_{max}$ decreases and, as stated above for the case of two correlators, the smaller value of $\delta_{max}$ increases the bandwidth available for user data and simplifies the complexity of each correlator.

Additional discussion is now directed to post processor 42 which, recall, in general receives the $SYNC_0$ and $SYNC_1$ outputs of the correlators, and in response outputs a final sync detected signal $SYNC_F$. Specifically, the preceding has illustrated that in certain instances, only one of phase 0 correlator 38 or phase 1 correlator 40 will sample within an appropriate sample window. In such an instance, then only that one correlator will assert its SYNC output. However, the preceding has further demonstrated that in other instances, such as where $\delta_{max}$ is greater than T/2, both correlators may assert their SYNC outputs. Post processor 42, therefore, provides additional functionality to address these various contingent scenarios, as discussed below.

Figure 9:
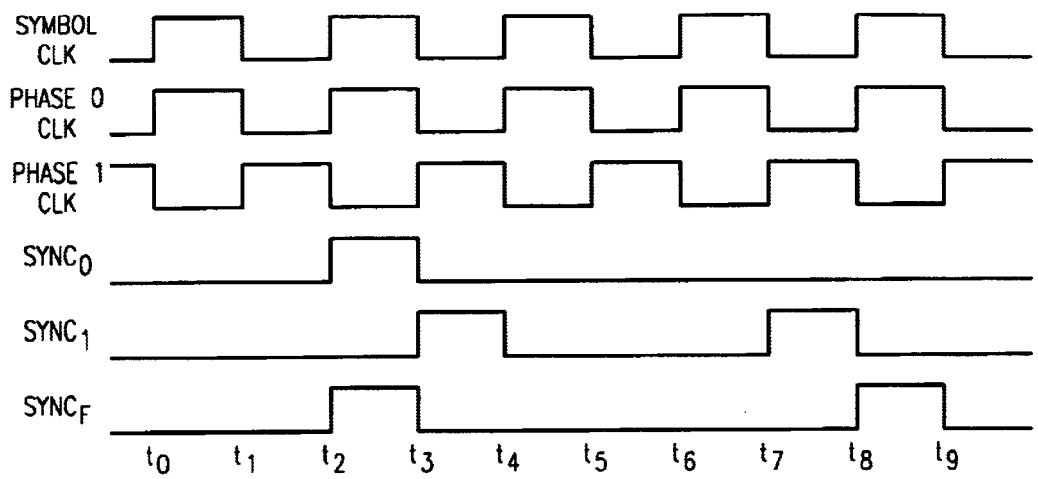
FIG. 9 illustrates a timing diagram of the operation of the sync block of FIG. 5.

The operation of post processor 42 is now described by way of a method 48 shown in flow chart form in FIG. 8, and further with reference to a sample timing diagram in FIG. 9. Looking first to FIG. 8, method 48 begins with a step 50 where post processor 42 awaits a sync detected signal pulse from either phase 0 correlator 38 or phase 1 correlator 40. Thus, once either $SYNC_0$ or $SYNC_1$ is asserted, method 48 continues from the wait state of step 50 to step 52. Step 52 directs the remaining flow based on which of correlators 38 or 40 asserted its sync detected signal pulse. If the source of the asserted sync detected signal pulse is phase 0 correlator 38, method 48 continues to step 54; conversely, if the source of the asserted sync detected signal pulse is phase 1 correlator 40, method 48 continues to step 56. Each of these alternative paths is discussed below.

In step 54, having been reached by post processor 42 due to a received assertion of $SYNC_0$, post processor 42 responds by asserting $SYNC_F$ during the current high state of the symbol clock. An example of this operation is shown with reference to FIG. 9. Specifically, the top row of FIG. 9 illustrates the symbol clock as input to clock generator 46, where recall that clock has a period equal to T. It is contemplated that the rising edge of the symbol clock causes operation of modem 18 in general, but of course an alternative embodiment could be constructed given the present teachings where the devices are triggered on a falling clock edge. The second and third rows of FIG. 9 illustrate the resulting clock signals applied to phase 0 correlator 38 (i.e., the phase 0 clock) and phase 1 correlator 40 (i.e., the phase 1 clock), respectively. Further with respect to these second and third rows, note that each rising edge of a phase clock causes its corresponding correlator to take a sample; thus, consistent with the earlier description, for a single period of the symbol clock, phase 0 correlator 38 takes a sample and at T/2 thereafter phase 1 correlator 40 takes a sample. For example, phase 0 correlator 38 is clocked at $t_0$, $t_2$, $t_4$, and so forth. Phase 1 correlator 40 is clocked at a time phase shifted by a duration of T/2 after phase 0 correlator 38 is clocked and, thus, for example, is clocked at $t_1$, $t_3$, $t_5$, and so forth. Returning now to the operation of step 54, an example of its occurrence is shown as occurring at time $t_2$. Particularly, the fourth and fifth rows in FIG. 9 illustrate some examples of the $SYNC_0$ and $SYNC_1$ outputs, and at time $t_2$ it is seen that $SYNC_0$ is asserted. Thus, step 52 forwards method 48 to step 54, and step 54 asserts $SYNC_F$ during the same then current high state of the symbol clock, as shown at $t_2$ in the sixth row of FIG. 9. In this regard, it should be noted that phase 0 correlator 38 is considered a dominant correlator in that its assertion of $SYNC_0$ always causes an immediate corresponding assertion of $SYNC_F$.

Alternatively in step 56, having been reached by post processor 42 due to a received assertion of $SYNC_1$, post processor 42 determines whether $SYNC_0$ was asserted for the current period of the symbol clock period (i.e., symbol clock high or low), that is, whether $SYNC_0$ was asserted at the time T/2 immediately before the current assertion of $SYNC_1$. If this is the case, then $SYNC_F$ is not asserted and instead method 48 returns to step 50 and awaits the next asserted one of $SYNC_0$ or $SYNC_1$. On the other hand, if $SYNC_0$ was not asserted at the time T/2 immediately before the current assertion of $SYNC_1$, method 40 continues to step 58. Each of these alternative paths is analyzed below.

Turning first to the example of flow from step 56 back to step 50, recall this occurs when $SYNC_0$ was asserted at the time T/2 immediately before the current assertion of $SYNC_1$. To further appreciate the effect of this flow, an example of this situation occurs at $t_3$ in FIG. 9. Specifically, at $t_3$ it is seen that SYNC, is asserted. Moreover, at the time T/2 immediately prior, that is, at $t_{2,\ SYNC0}$ was asserted. Thus, at time $t_3$ there is no assertion of $SYNC_F$. Due to this operation, therefore, $SYNC_F$ is only asserted at $t_2$ (because of the assertion of SYNC0), and it is not again asserted immediately thereafter at $t_3$. In operating in this manner, therefore, note that even when both $SYNC_0$ and $SYNC_1$ have been asserted in consecutive cycles, only a single assertion of a sync detected signal pulse, $SYNC_F$, is allowed to reach other circuits requiring synchronization in the modem. Consequently, there is an avoidance of any lock-up or wrongful action which could otherwise occur if two sync pulses were consecutively issued and used to trigger attempts by other circuits to synchronize to the incoming frame. Lastly, following the completion of step 54, method 48 returns to the wait state of step 50.

Turning second to the example of flow from step 56 continuing to step 58, recall this occurs when $SYNC_1$ was asserted and $SYNC_0$ was not asserted at the time T/2 immediately before the current assertion of $SYNC_1$. To further appreciate the effect of this flow, an example of this situation occurs at $t_7$ in FIG. 9. Specifically, at $t_7$ it is seen that $SYNC_1$ is asserted, and at the time T/2 immediately prior (i.e., $t_6$), $SYNC_0$ was not asserted. In response, step 58 asserts $SYNC_F$ during the next high state of the symbol clock. Accordingly, $SYNC_F$ is only asserted at $t_8$, which therefore corresponds to the rising edge and high state of the symbol clock. In operating in this manner, therefore, note that this or the earlier-described assertion of $SYNC_F$ always occurs only on a high state of the symbol clock. Accordingly, $SYNC_F$ is only asserted at the same clock edge (i.e., the rising edge of the symbol clock) as that used for other devices clocked by the symbol clock, which thereby ensures more consistent operation by the devices receiving the $SYNC_F$ signal. Lastly, following the completion of step 58, method 48 returns to the wait state of step 50.

Figure 10:
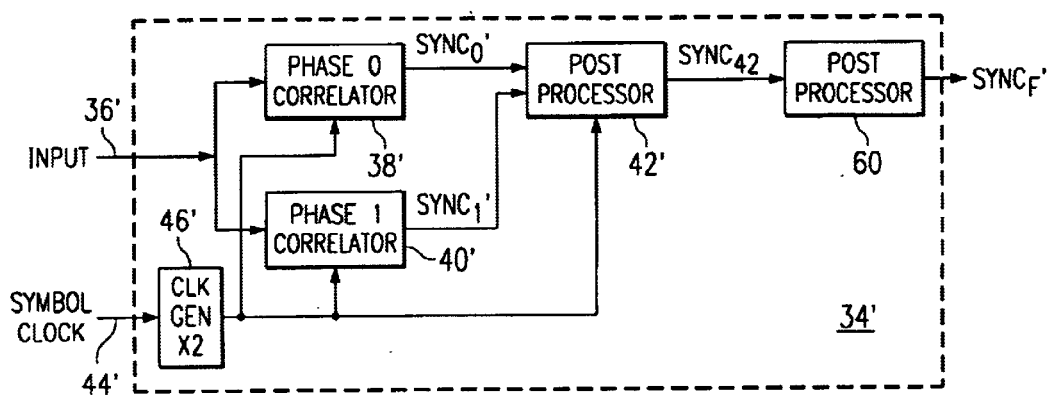
FIG. 10 illustrates a block diagram of a second embodiment of an improved synchronization block for use in a modem such as that shown in FIG. 2 or in other wireline modems.

FIG. 10 illustrates a block diagram of an alternative inventive sync block 34'. Sync block 34' includes all of the aspects of sync block 34 shown in FIG. 5 and, thus, to demonstrate these like items, the same reference numerals are carried forward into FIG. 10 and an apostrophe is added thereto. In addition, however, sync block 34' includes a second post processor identified generally at 60. More specifically, post processor 60 receives the synchronization signal from post processor 42' and, based on a method detailed below, outputs in various instances its own final sync detected signal, $SYNC_F'$, where $SYNC_F'$ may be connected to various other devices within the modem implementing sync block 34' for purposes of synchronization. To further illustrate this operation and by way of convention, for the FIG. 10 embodiment the sync detected signal from post processor 42' is re-named from $SYNC_F$ to $SYNC_{42}$ to more easily distinguish it from $SYNC_F'$ provided by post processor 60.

Figure 11:
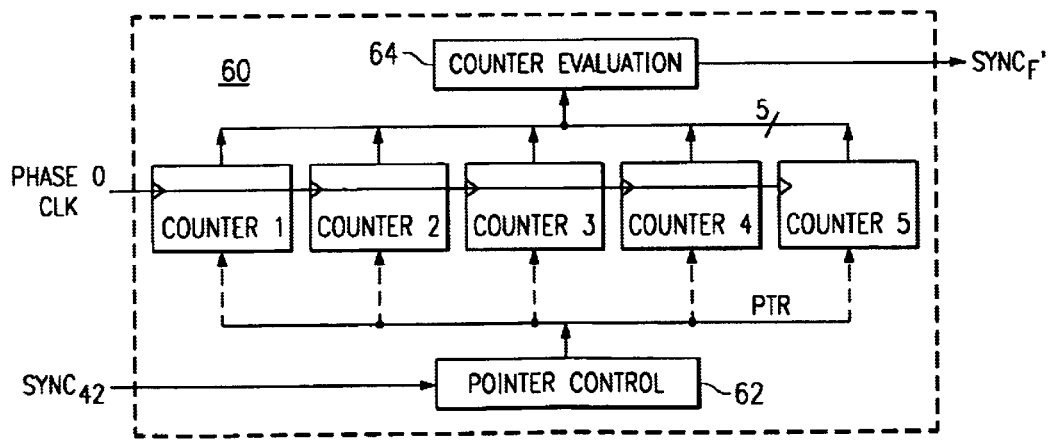
FIG. 11 illustrates a block diagram of the preferred embodiment of post processor 60 in FIG. 10.

The operation of post processor 60 is explored later, with reference first made to FIG. 11 which illustrates a block diagram of post processor 60 in detail. In the preferred embodiment, post processor 60 includes a number of counters, with that number selected in a manner discussed later. For the present example, the number equals five and, thus, shown in FIG. 11 are counters CTR1 through CTR5. Each counter is connected to receive the phase 0 clock signal (i.e., the dominant clock signal) and advances its count, in response to being clocked, from zero to an integer value equal to N−1, where for reasons detailed below N equals the number of clock cycles that should occur between synchronization detection (i.e., from the proper assertion of $SYNC_F'$ to the next proper assertion of $SYNC_F'$). This time is known since it relates to the number of symbols in frame 10. Once a counter reaches N−1, on its next clock it rolls over to a value of zero, and thereafter it repeats the advancement just described toward a value of N−1. In addition, post processor 60 includes a pointer PTR that is under the control of a pointer control circuit 62. The detailed operation of pointer control circuit 62 is discussed below, but at this point it is noted pointer PTR moves in a circular fashion so that it points to a given counter and is then advanced to the next highest counter until it wraps around from counter CTR5 to counter CTR1. The values of the counts from each counter are connected as inputs to a counter evaluation circuit 64. Counter evaluation circuit 64 operates as detailed later to provide the final sync detected signal $SYNC_F'$.

The operation of post processor 60 is now discussed. By way of introduction, the operation of post processor 60 in general is performed preferably in an effort to address a first situation, and may be further expanded in still another embodiment to address a second situation. The first situation preferably addressed by post processor 60 is to prevent a spurious assertion of $SYNC_{42}$ from reaching the other synchronizing components in the modem. The second situation that may be addressed by post processor 60 is to assert $SYNC_F'$ to the other synchronizing components in the modem in the case where $SYNC_{42}$ should have been timely asserted but was not (i.e.; neither $SYNC_0$ nor $SYNC_1$ was timely asserted). Each of these two situations is discussed below.

The first of the operational aspects of post processor 60 is now introduced in general. In one aspect, post processor 60 intercepts any spurious assertion of $SYNC_{42}$ in an effort to prevent it from reaching other modem components. More particularly, recall in connection with sync block 34 of FIG. 5 that its $SYNC_F$ signal as provided by post processor 42 is used to synchronize various other modem circuits. However, it has been determined that various factors, such as noise, may cause an occasional spurious assertion of the sync detected signal from post processor 42 (here re-labeled as $SYNC_{42}$). Accordingly, in the alternative embodiment of sync block 34' in FIG. 10, post processor 60 is added to respond to this event. More particularly, to the extent that post processor 60 determines that SYNC was properly asserted, then the assertion is immediately translated into a corresponding assertion of $SYNC_F'$ (e.g., by passing $SYNC_{42}$ through to $SYNC_F'$). However, if post processor 60 determines that an assertion of $SYNC_{42}$ was spurious, then $SYNC_F'$ is not correspondingly asserted. In the preferred embodiment, this aspect is achieved by monitoring the last integer M number of assertions of $SYNC_{42}$ and responding as explored in greater detail given the operation of pointer control circuit 62 and counter evaluation circuit 64.

Figure 12:
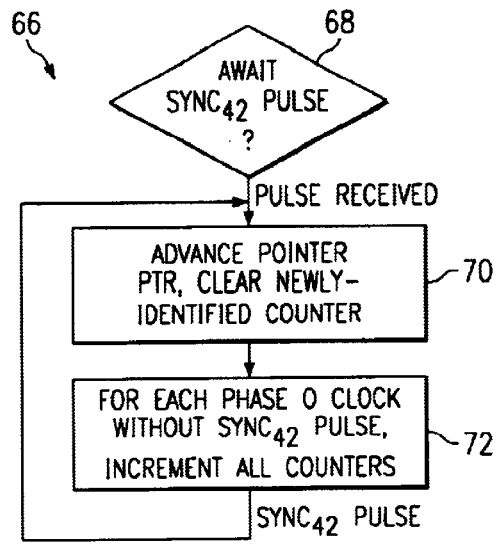
FIG. 12 illustrates a flow chart of the method of operation of pointer control circuit 62 of FIG. 11.

The counter maintenance aspect of pointer control circuit 62 is now described in detail by way of a method 66 shown in flow chart form in FIG. 12. Method 66 commences with a wait state step 68, where pointer control circuit 62 awaits an assertion of $SYNC_{42}$. During this time and all others, each of the counters advance in response to an assertions (e.g., rising edge) of the phase 0 clock. Once $SYNC_{42}$ is asserted, method 66 continues from the wait state of step 68 to step 70. In step 70, pointer control circuit 62 advances pointer PTR so that it then points to the next higher numbered counter, or given the circular nature described above, if pointer PTR was pointing to counter CTR5 prior to step 70, then step 70 advances pointer PTR so that it then points to counter CTR1. In addition, step 70 clears the count in the newly identified counter. Next, in step 72, pointer control circuit 62 causes each of the counters to continue to increment for each phase 0 clock where there is no corresponding assertion of $SYNC_{42}$. However, once there is a phase 0 clock along with an assertion of $SYNC_{42}$ then method 66 returns to step 70 so that the next counter is identified by pointer PTR and cleared, followed by a repeat of step 72 so that the next identified counter then counts upward starting from zero and in response to each phase 0 clock where there is no corresponding assertion of $SYNC_{42}$, while the other counters likewise increment in response to the phase 0 clock.

To further demonstrate the operation of method 66, assume by way of a numerical example that under normal and proper operations, there are 16 assertions of the symbol clock between each proper synchronization event. In other words, under proper sync detection, $SYNC_{42}$ is asserted every 16 symbol clocks and, thus, every 16 phase 0 clocks. Further, recall that N equals the number of symbol clocks between sync detections and, hence, each of counters CTR1 through CTR5 counts from zero up to a value of 15 (i.e., N−1), and on the next clock to a given counter it rolls over to a value of zero to once again count upward from that value. From these assumptions, it is now demonstrated that under proper sync operation method 66 produces a result that at some point each of counters CTR1 through CTR5 stores a value of zero. More particularly, assume at start up that method 66 is in the wait state of step 68 and that pointer PTR points to counter CTR1 during this time. Next, assume $SYNC_{42}$ is asserted. At this point, pointer PTR advances to identify counter CTR2 and that counter is cleared. Next, for each assertion of the phase 0 clock where $SYNC_{42}$ is not asserted, counter CTR2 increments. Thus, given the present example, for the next 15 assertions of the phase 0 clock, counter CTR2 increments, thereby resulting in it storing a counter equal to 15. For the very next assertion of the phase 0 clock where $SYNC_{42}$ is not asserted, counter CTR2 rolls over to store a value equal to 0. Continuing with the normal operation, on the next assertion of the phase 0 clock, $SYNC_{42}$ is asserted, thereby advancing pointer PCT to counter CTR3 and clearing that counter. Next, there are 15 phase 0 clocks without an assertion of $SYNC_{42}$, where each correspondingly increments counter CTR3. At the same time, these same 15 phase 0 clocks are incrementing counter CTR2 (as well as the other counters). Thus, both counters CTR2 and CTR3 each have the same count at a given time, somewhere between 0 and 15. On the sixteenth phase 0 clock, both counters CTR2 and CTR3 roll over to zero. At the same time, however, under proper operations, $SYNC_{42}$ is asserted, thereby advancing pointer PTR to counter CTR4 and clearing it to zero. This process then continues for each counter so that once pointer PTR has cleared each counter and there have been proper assertions of $SYNC_{42}$ every 16 symbol (and phase 0) clocks, then at that point each counter stores a value equal to zero. Lastly, it now should be appreciated that the number of counters, here equal to five, defines the amount of past history, that is, the number of most recently asserted $SYNC_{42}$ signals, that are monitored by post processor 60.

Figure 13:
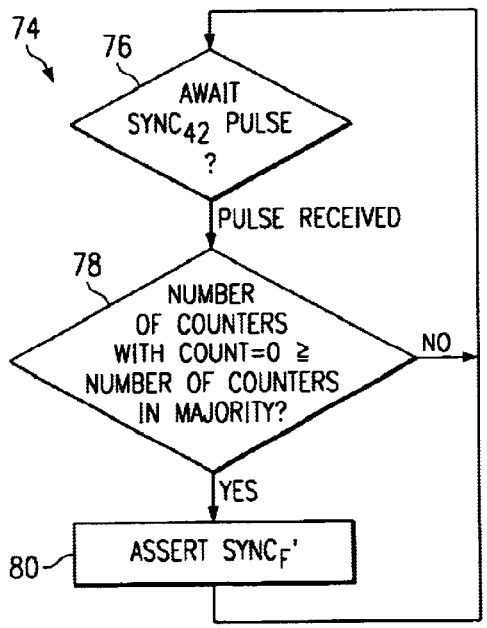
FIG. 13 illustrates a flow chart of the method of operation of counter evaluation circuit 64 of FIG. 11 to prevent a spurious sync detected signal from causing a final sync detected signal to reach various modem components.

The preceding discussion of normal operations and the resulting counts provides a background to appreciate the first aspect of the preferred operation of counter evaluation circuit 64 which is now described by way of a method 74 shown in flow chart form in FIG. 13. Method 74 commences with a start step 76, where counter evaluation circuit 64 awaits an assertion of $SYNC_{42}$. Once $SYNC_{42}$ is asserted, method 74 continues from the wait state of step 76 to step 78. In step 78, counter evaluation circuit 64 determines whether the number of counters storing a value equal to zero is equal to or greater than the majority of the number of M counters. Thus, in the example of post processor 60 in FIG. 11, step 78 determines whether at least three counters store a value of zero If so, method 78 continues to step 80, whereas if not, method 78 returns to step 76. In step 80, having been reached because at least a majority of counters store a value equal to zero, counter evaluation circuit 64 asserts $SYNC_F'$ as corresponding to the asserted $SYNC_{42}$ received in step 76. Thereafter, method 74 returns to the wait state of step 76 until the next assertion of $SYNC_{42}$.

Given the above description of FIG. 13, it now may be appreciated that method 74 evaluates the counters to identify either normal operation (i.e., timely assertions of $SYNC_{42}$) as indicated by the equilibrium of either all or a majority of zero counts described above or, alternatively, to identify a potential spurious assertion of $SYNC_{42}$ when a majority of the counters do not reflect the above-described equilibrium. Further, when equilibrium or near-equilibrium is identified, then counter evaluation circuit 64 asserts $SYNC_F'$ in response to a corresponding received assertion of $SYNC_{42}$. Alternatively, when a potential spurious assertion of $SYNC_{42}$ is identified, then counter evaluation circuit 64 merely receives the asserted $SYNC_{42}$, but does not assert $SYNC_F'$ so that the other synchronized modem components are not disturbed by this spurious event. To further appreciate these operations, below are presented a few numeric examples.

As a first example of the operation of counter evaluation circuit 64 per method 74, recall the preceding example where N equals 16 and assume that complete equilibrium is achieved, that is, all counters are on track to reach a value of zero on the next assertion of $SYNC_{42}$. For example, assume that counter CTR2 is currently identified by pointer PTR and has a value of 12, and all counters other than counter CTR2 also store a value of 12, as shown in Table 1.1:

TABLE 1.1

| CTR1 | CTR2 | CTR3 | CTR4 | CTR5 |
|------|------|------|------|------|
| 12   | 12   | 12   | 12   | 12   |

Next, assume there are three more phase 0 clocks without an assertion of $SYNC_{42}$. At this point, therefore, the value of the counters are as shown below in Table 1.2:

TABLE 1.2

| CTR1 | CTR2 | CTR3 | CTR4 | CTR5 |
|------|------|------|------|------|
| 15   | 15   | 15   | 15   | 15   |

Still further, in the next phase 0 clock, assume $SYNC_{42}$ is asserted. Accordingly, each counter rolls over to a value of zero, pointer PTR moves from counter CTR2 to counter CTR3 and counter CTR3 is cleared, and counter evaluation circuit 64 moves from step 76 to step 78. Further, since all counters then equal zero, the flow continues to step 80. Consequently, in step 80, in response to the received assertion of $SYNC_{42}$, counter evaluation circuit 64 provides a corresponding assertion of $SYNC_F'$. In effect, therefore, the asserted $SYNC_{42}$ is merely passed onward in the form of the asserted $SYNC_F'$.

As a second example of the operation of counter evaluation circuit 64 per method 74, assume now that counter CTR1 is currently identified by pointer PTR, and due to the five most recent assertions of $SYNC_{42}$, the counts in counters CTR1 through CTR5 are as shown in Table 2.1:

TABLE 2.1

| CTR1 | CTR2 | CTR3 | CTR4 | CTR5 |
|------|------|------|------|------|
| 12   | 12   | 12   | 12   | 12   |

Next, assume that $SYNC_{42}$ is asserted during the next phase 0 clock. Accordingly, pointer PTR advances to counter CTR2 which is then cleared, and at this point the counts in counters CTR1 through CTR5 are as shown in Table 2.2:

TABLE 2.2

| CTR1 | CTR2 | CTR3 | CTR4 | CTR5 |
|------|------|------|------|------|
| 13   | 0    | 13   | 13   | 13   |

Given this example, counter evaluation circuit 64 moves from step 76 to step 78, and since the majority of the counters do not then equal zero, then the flow returns to step 76. As a result, step 80 is not reached and $SYNC_F'$ is not asserted. In other words, it has been detected at this point that the assertion of $SYNC_{42}$ was a spurious assertion and, as a result, no final synchronization signal $SYNC_F'$ is allowed to reach the other synchronized components of the modem.

Turning now to an additional aspect of the operation of post processor 60, various factors also may cause $SYNC_{42}$ not to be asserted when in fact it should be asserted, that is, when the anticipated time for $SYNC_{42}$ to have been asserted occurs, post processor 60 may respond even if in fact $SYNC_{42}$ was not asserted. In general, the response by post processor 60 is to insert an assertion of $SYNC_F'$ in the appropriate time slot in an effort to maintain proper synchronization notwithstanding the fact that $SYNC_{42}$ was not timely asserted. In the preferred embodiment, this aspect is also achieved by monitoring the past history of $SYNC_{42}$ as represented by the last integer M number of assertions of $SYNC_{42}$, and responding as explored in greater detail with reference to FIG. 14.

Figure 14:
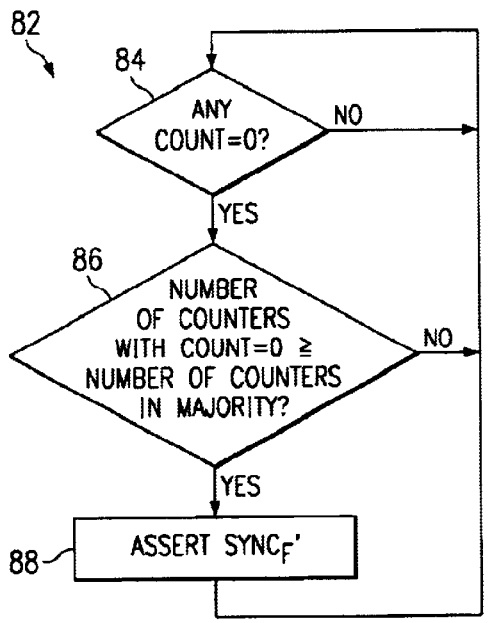
FIG. 14 illustrates a flow chart of the method of operation of counter evaluation circuit 64 of FIG. 11 to output a final sync detected signal in instances where sync detection did not occur but was anticipated to have occurred based on earlier timing history of prior sync detection events.

FIG. 14 illustrates a flowchart of a method 82 which also may be included within the functionality of post processor 60 as introduced above. Method 82 commences with a step 84 that waits for the count in any of counters CTR1 through CTR5 to reach zero. When this occurs, method 82 continues from to step 86. In step 86, counter evaluation circuit 64 determines whether the number of counters storing a value equal to zero is equal to or greater than the majority of the number of M counters. Thus, in the example of post processor 60 in FIG. 11, step 86 determines whether at least three counters store a value of zero. If so, method 82 continues to step 88, whereas if not, method 82 returns to step 84. In step 88, having been reached because at least a majority of counters store a value equal to zero, counter evaluation circuit 64 asserts $SYNC_F'$ regardless of whether $SYNC_{42}$ was asserted in the same clock cycle that caused the counter to reach a count of zero from step 84. Thereafter, method 82 returns to the zero detection operation of step 84.

Given the above description of FIG. 14, it now may be appreciated that method 82 evaluates the counters to identify an instance where $SYNC_{42}$ should have been asserted but was not, and responds by asserting a final sync signal $SYNC_F'$ because it was expected that $SYNC_{42}$ should have been asserted. To further appreciate these operations, below are presented a few numeric examples.

As a first example of the operation of counter evaluation circuit 64 per method 82, recall again the preceding example where N equals 16 and assume that complete equilibrium is achieved, that is, all counters are on track to reach a value of zero on the next assertion of $SYNC_{42}$. For example, assume that counter CTR3 is currently identified by pointer PTR and has a value of 14, and all counters other than counter CTR3 also store a value of 14, as shown in Table 3.1:

TABLE 3.1

| CTR1 | CTR2 | CTR3 | CTR4 | CTR5 |
|------|------|------|------|------|
| 14   | 14   | 14   | 14   | 14   |

Next, assume that two more phase 0 clocks are asserted, but $SYNC_{42}$ is not asserted. At this point, therefore, pointer PTR does not advance but instead it continues to point to counter CTR3. However, the two additional phase 0 clocks have now caused all of the counters to roll to zero, as shown in the Table 3.2:

TABLE 3.2

| CTR1 | CTR2 | CTR3 | CTR4 | CTR5 |
|------|------|------|------|------|
| 0    | 0    | 0    | 0    | 0    |

Given the instance illustrated by Table 3.2, method 82 moves from step 84 to step 86 because at least one count equals zero. Further, step 86 determines that the number of counters having a value of zero, which here is all five counters, is equal to or exceeds the number of counters in the majority (i.e., three). Consequently, method 82 continues to step 88 which asserts $SYNC_F'$. Thus, even though $SYNC_{42}$ was not asserted, under method 82 of FIG. 14 $SYNC_F'$ is asserted because it was anticipated, based on the past history of $SYNC_{42}$ assertions, that $SYNC_{42}$ should have been asserted during the current clock which thereby would have caused $SYNC_F'$ to be asserted under method 74 of FIG. 13. Accordingly, method 82 effectively inserts a $SYNC_F'$ assertion where one might otherwise not have occurred because $SYNC_{42}$ was not asserted (i.e., because neither $SYNC_0$ nor $SYNC_1$ were asserted).

From the above, it may be appreciated that the above embodiments provide improved operation for synchronization in a wireline modem. Moreover, while the present embodiments have been described in detail, various substitutions, modifications or alterations could be made to the descriptions set forth above without departing from the inventive scope. For example, many of the various blocks set forth herein are defined in terms of their functionality and, thus, one skilled in the art may choose various forms to implement that functionality. For example, some or all of the functionality provided may be embodied using a single digital signal processor, or in alternative circuits such as in an application specific integrated circuit or a larger circuit that forms other aspects of the modem functionality. As still another example, while separate sampling circuits have been shown to achieve multiple actual samples per each ideal sample point, a single circuit could be constructed to take such multiple samples with additional circuitry to then evaluate those samples consistent with the methodologies described herein. In any event, these examples as well as others discussed earlier and those ascertainable by one skilled in the art further develop the inventive scope, as is defined by the following claims.

What is claimed is:

1. A modem, comprising:
   circuitry for receiving an analog signal from a line;
   circuitry for converting the analog signal to a digital signal comprising a plurality of ideal sample points, wherein the plurality of ideal sample points comprises a sync sequence, wherein each of the plurality of ideal sample points is separated in time by a period T; and
   circuitry for detecting the sync sequence, comprising:
      an integer number S of sampling circuits, wherein S is two or greater and each of the sampling circuits comprises:
         circuitry for taking a sample corresponding to each of the plurality of ideal sample points at least once per the period T;
         circuitry for comparing a plurality of taken samples to a correlation sequence; and
         circuitry for outputting a sync detected signal in response to a sufficient match between the plurality of taken samples and the correlation sequence.

2. The modem of claim 1 wherein the integer number S equals two.

3. The modem of claim 2:
   wherein the integer number S of sampling circuits consist of a first sampling circuit and a second sampling circuit; and
   wherein the circuitry for taking a sample of the first sampling circuit and the circuitry for taking a sample of the second sampling circuit operate in alternating fashion.

4. The modem of claim 3 wherein the circuitry for taking a sample of the first sampling circuit operates at a time difference of T/2 from the circuitry for taking a sample of the second sampling circuit.

5. The modem of claim 1 and further comprising a post processing circuit, the post processing circuit comprising:
   the integer number S of inputs, wherein each of the integer number S of inputs is for receiving a sync detected signal from a corresponding one of integer number S of sampling circuits; and
   circuitry for presenting a final sync detected signal in response to the integer number S of inputs.

6. The modem of claim 5 wherein the circuitry for presenting the final sync detected signal in response to the integer number S of inputs comprises:

circuitry for receiving a symbol clock;

circuitry for responding to one of the integer number S of inputs as a dominant input;

circuitry for presenting the final sync detected signal during a first symbol clock when during the first symbol clock a sync detected signal is received at the dominant input; and circuitry for presenting the final sync detected signal during a second clock period immediately following the first symbol clock when during the first symbol clock a sync detected signal is not received at the dominant input and a sync detected signal is received at one of the integer number S of inputs other than the dominant input.

7. The modem of claim 1 and further comprising a post processing circuit, the post processing circuit comprising:

an input for receiving at least one signal responsive to the sync detected signals from the sampling circuits;

evaluating circuitry for evaluating multiple time differences between multiple received signals responsive to the sync detected signals;

an output for presenting a final sync detected signal; and circuitry for selectively outputting the at least one signal responsive to the sync detected signals to the output as the final sync detected signal in response to the evaluating circuit.

8. The modem of claim 7 wherein the circuitry for selectively outputting the at least one signal responsive to the sync detected signals to the output as the final sync detected signal comprises circuitry for outputting the at least one signal responsive to the sync detected signals to the output as the final sync detected signal in response to the evaluating circuitry determining that a majority of the multiple time differences equal a predetermined time period.

9. The modem of claim 8 and further comprising an equalizer for training in response to the plurality of ideal sample points, wherein the equalizer synchronizes to the plurality of ideal sample points in response to the final sync detected signal.

10. The modem of claim 7 wherein the circuitry for selectively outputting the at least one signal responsive to the sync detected signals to the output as the final sync detected signal comprises circuitry for suppressing the at least one signal responsive to the sync detected signals in response to the evaluating circuitry determining that a majority of the multiple time differences do not equal a predetermined time period.

11. The modem of claim 10 and further comprising an equalizer for training in response to the plurality of ideal sample points, wherein the equalizer synchronizes to the plurality of ideal sample points in response to the final sync detected signal.

12. The modem of claim 7:

wherein the circuitry for selectively outputting the at least one signal responsive to the sync detected signals to the output as the final sync detected signal comprises circuitry for outputting the at least one signal responsive to the sync detected signals to the output as the final sync detected signal in response to the evaluating circuitry determining that a majority of the multiple time differences equal a predetermined time period; and wherein the circuitry for selectively outputting the at least one signal responsive to the sync detected signals to the output as the final sync detected signal comprises circuitry for suppressing the at least one signal responsive to the sync detected signals in response to the evaluating circuitry determining that a majority of the multiple time differences do not equal the predetermined time period.

13. The modem of claim 1 and further comprising a post processing circuit, the post processing circuit comprising:

an input for receiving at least one signal responsive to the sync detected signals from the sampling circuits;

evaluating circuitry for evaluating multiple time differences between multiple received signals responsive to the sync detected signals;

an output for presenting a final sync detected signal; and circuitry for outputting the final sync detected signal to the output in response to the evaluating circuit determining that at least one signal responsive to the sync detected signals was not received at a time difference equal to a majority of the multiple time differences.

14. The modem of claim 13 and further comprising an equalizer for training in response to the plurality of ideal sample points, wherein the equalizer synchronizes to the plurality of ideal sample points in response to the final sync detected signal.

15. The modem of claim 1 and further comprising a post processing circuit, the post processing circuit comprising:

an input for receiving at least one signal responsive to the sync detected signals from the sampling circuits;

evaluating circuitry for evaluating multiple time differences between multiple received signals responsive to the sync detected signals;

an output for presenting a final sync detected signal;

circuitry for selectively outputting the at least one signal responsive to the sync detected signals to the output as the final sync detected signal in response to the evaluating circuit determining that a majority of the multiple time differences equal a predetermined time period; and circuitry for outputting the final sync detected signal to the output in response to the evaluating circuit determining that at least one signal responsive to the sync detected signals was not received at a time difference equal to a majority of the multiple time differences.

16. The modem of claim 15 and further comprising an equalizer for training in response to the plurality of ideal sample points, wherein the equalizer synchronizes to the plurality of ideal sample points in response to the final sync detected signal.

17. The modem of claim 1 and further comprising an equalizer for training in response to the plurality of ideal sample points, wherein the equalizer synchronizes to the plurality of ideal sample points in response to the final sync detected signal.

18. The modem of claim 1:

wherein the circuitry for comparing a plurality of taken samples to a correlation sequence comprises circuitry for convolving the plurality of taken samples with the correlation sequence; and wherein the circuitry for outputting a sync detected signal in response to a sufficient match between the plurality of taken samples and the correlation sequence comprises circuitry for comparing a result of the convolving operation to a threshold.

19. The modem of claim 1 wherein the integer number S is greater than two.

20. The modem of claim 1 wherein the circuitry for taking a sample of each of the sampling circuits operate in alternating fashion and a time difference of T/S from another one of the sampling circuits.

21. The modem of claim 1 wherein the line comprises a coax cable.

22. A method of operating a modem, comprising:

receiving an analog signal from a line;

converting the analog signal to a digital signal comprising a plurality of ideal sample points, wherein the plurality of ideal sample points comprises a sync sequence, wherein the plurality of ideal sample points are separated in time by a period T; and detecting the sync sequence, comprising the steps of:

at least once per the period T, taking an integer number S of samples corresponding to each of the plurality of ideal sample points, wherein S is two or greater;

comparing a plurality of taken samples to a correlation sequence; and outputting at least one sync detected signal in response to a sufficient match between the plurality of taken samples and the correlation sequence.

23. The method of claim 22:

wherein the integer S equals two; and wherein the step of taking an integer number S of samples comprises taking two samples at a time difference of T/2 from one another.

24. The method of claim 22 and further comprising the steps of:

receiving during a symbol clock period at least one of a first sync detected signal and a second sync detected signal corresponding to different ones of the plurality of taken samples for a given period T, wherein the first sync detected signal comprises a dominant signal;

outputting a final sync detected signal during the first symbol clock when during the first symbol clock a sync detected signal is received at the dominant input; and outputting a final sync detected signal during a second clock period immediately following the first symbol clock when during the first symbol clock the second sync detected signal is not received and the second sync detected signal is received.

25. The method of claim 22 and further comprising the steps of:

receiving at least one signal responsive to the sync detected signals;

evaluating multiple time differences between multiple signals responsive to the sync detected signals;

selectively outputting to an output the at least one signal responsive to the sync detected signals, as a final sync detected signal, in response to the evaluating step.

26. The method of claim 25 wherein the selectively outputting step comprises outputting to the output the at least one signal responsive to the sync detected signals, as the final sync detected signal, in response to the evaluating step determining that a majority of the multiple time differences equal a predetermined time period.

27. The method of claim 25 wherein the selectively outputting step comprises outputting to the output the at least one signal responsive to the sync detected signals, as the final sync detected signal, comprises suppressing the at least one signal responsive to the sync detected signals in response to the evaluating circuitry determining that a majority of the multiple time differences do not equal a predetermined time period.

28. The method of claim 22 and further comprising the steps of:

receiving at least one signal responsive to the sync detected signals;

evaluating multiple time differences between multiple signals responsive to the sync detected signals;

outputting to an output a final sync detected signal in response to the evaluating step determining that at least one signal responsive to the sync detected signals was not received at a time difference equal to a majority of the multiple time differences.

* * * * *